May 30, 1944.     B. J. CRAIG     2,349,940
AUTOMOTIVE VEHICLE CONSTRUCTION
Filed Feb. 12, 1940     12 Sheets-Sheet 3
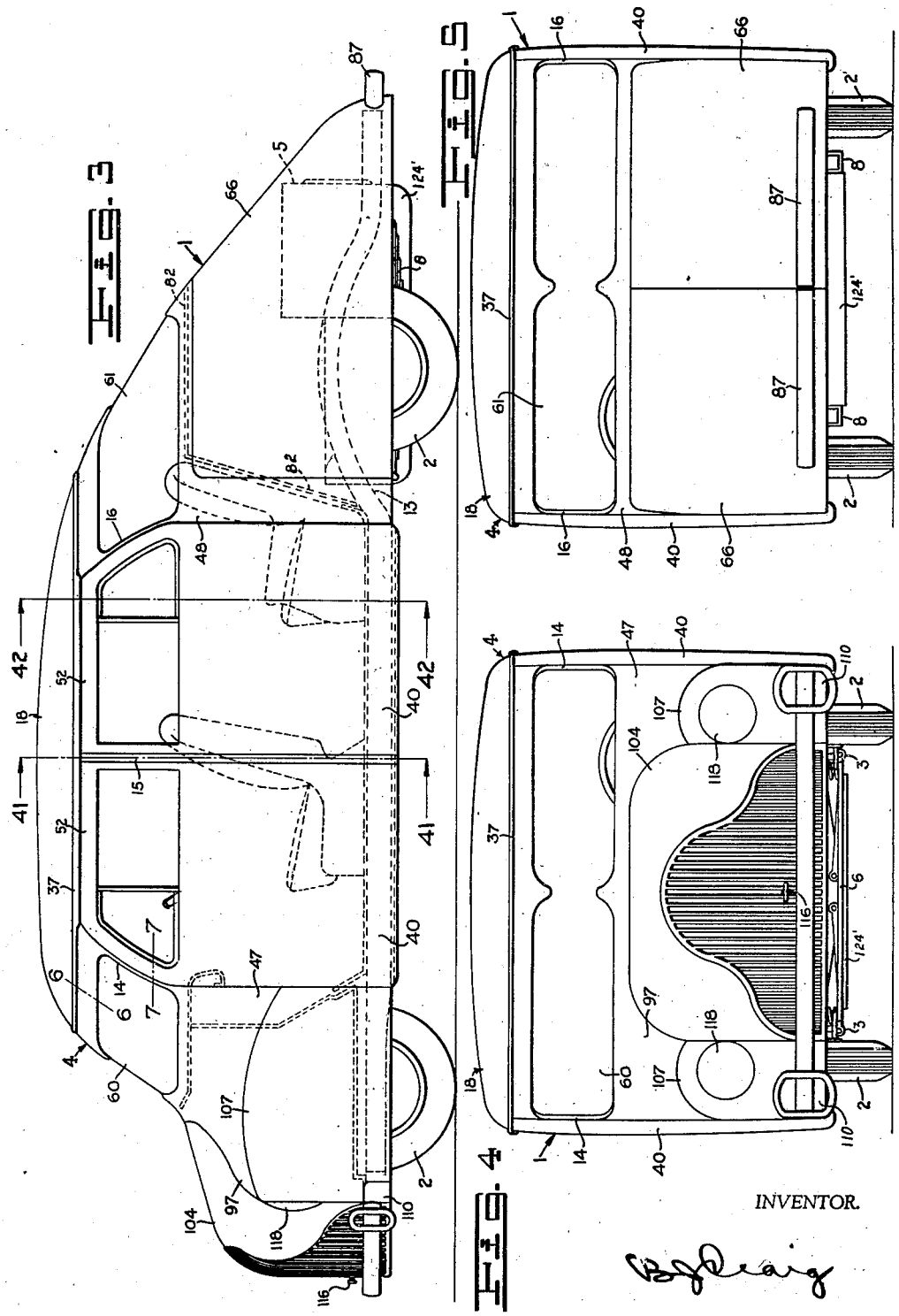
INVENTOR.

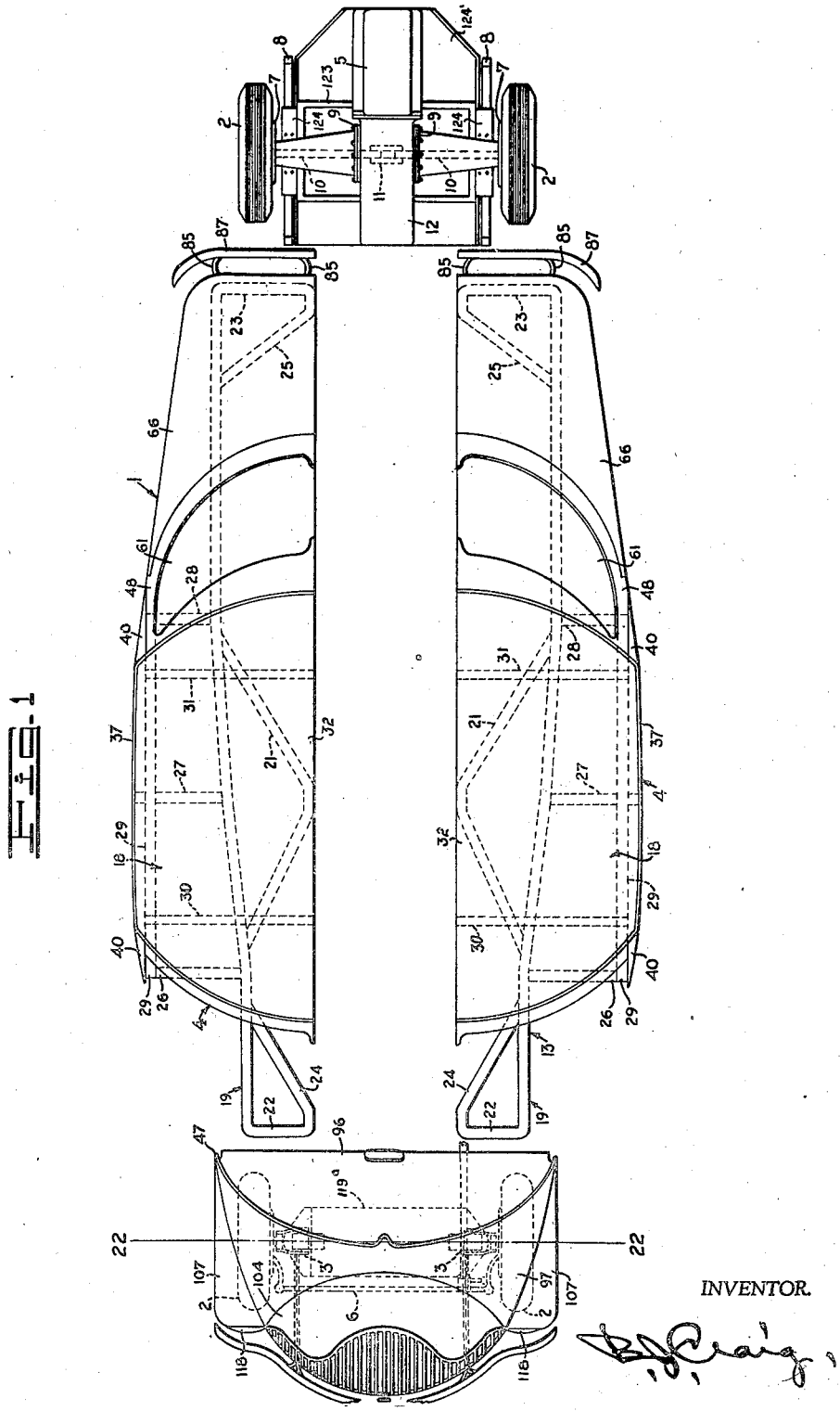

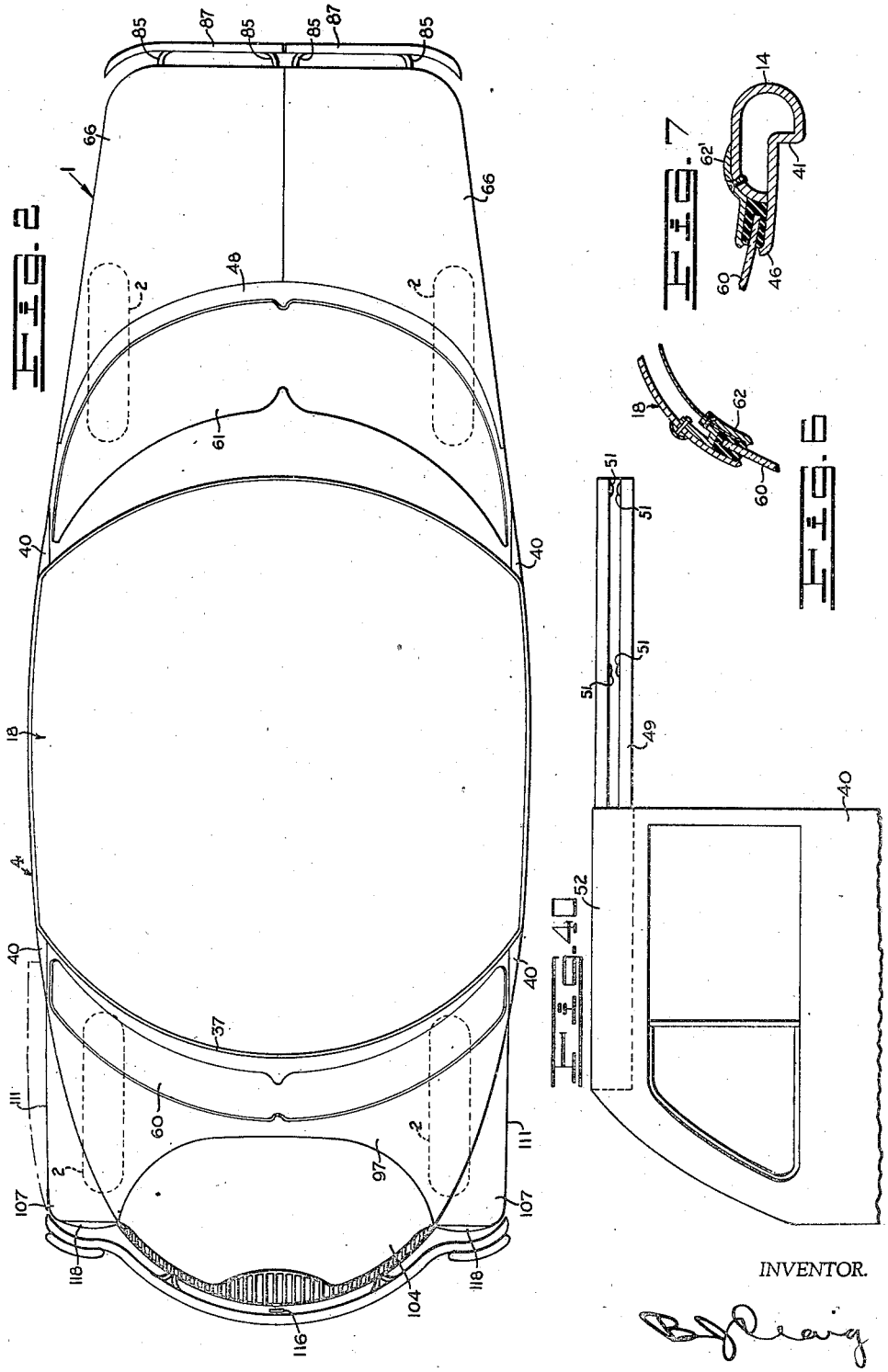

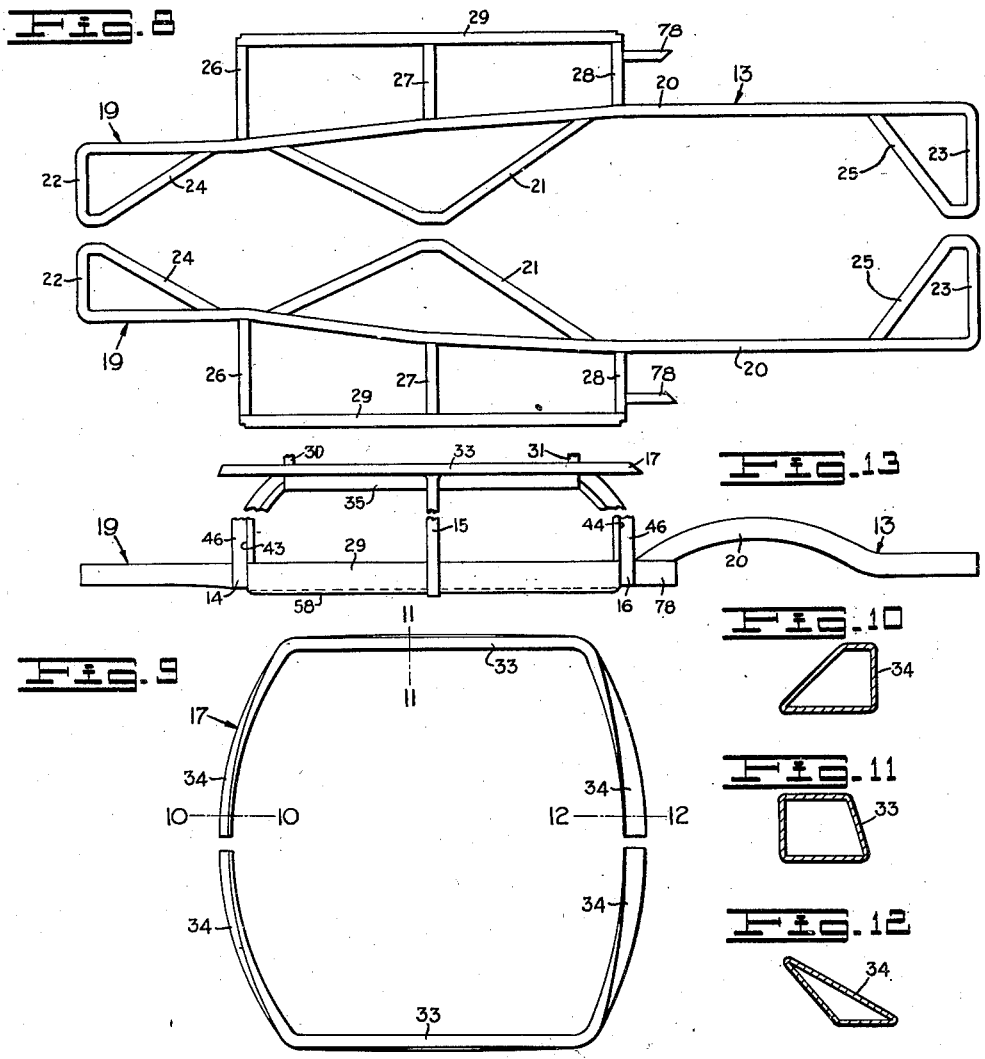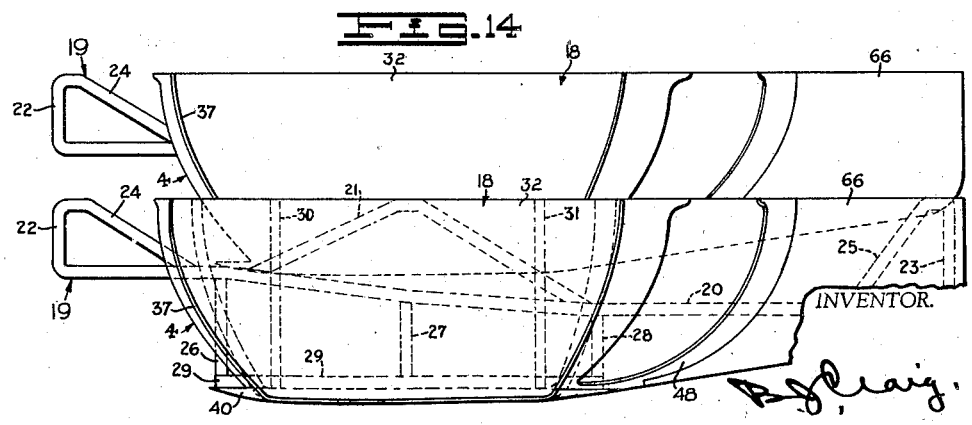

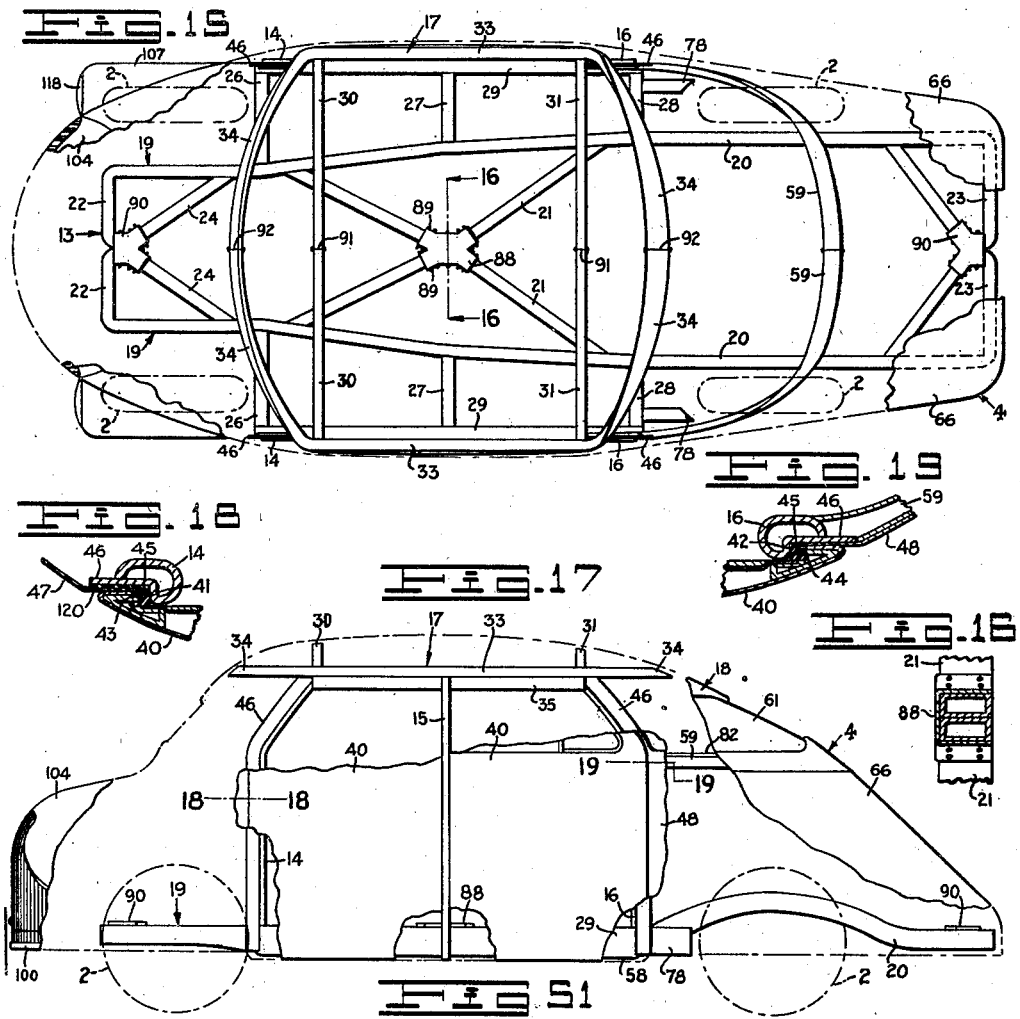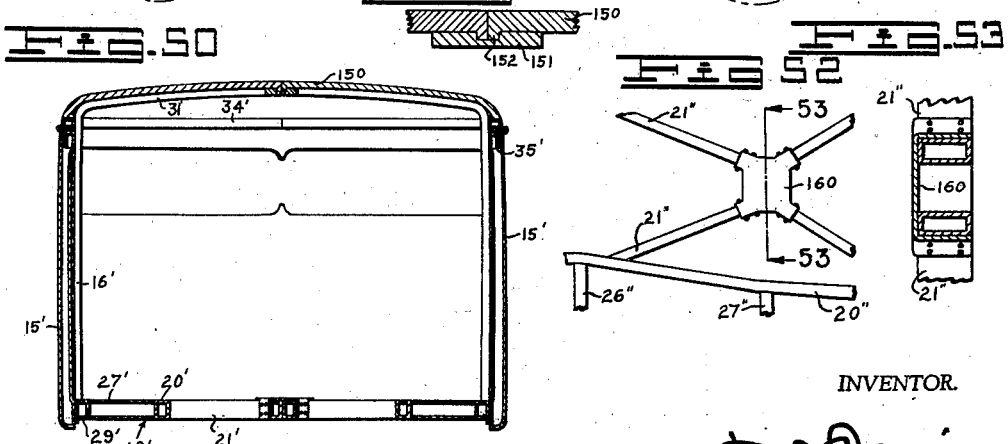

May 30, 1944.　　　　B. J. CRAIG　　　　2,349,940
AUTOMOTIVE VEHICLE CONSTRUCTION
Filed Feb. 12, 1940　　　12 Sheets-Sheet 6

INVENTOR.
B. J. Craig

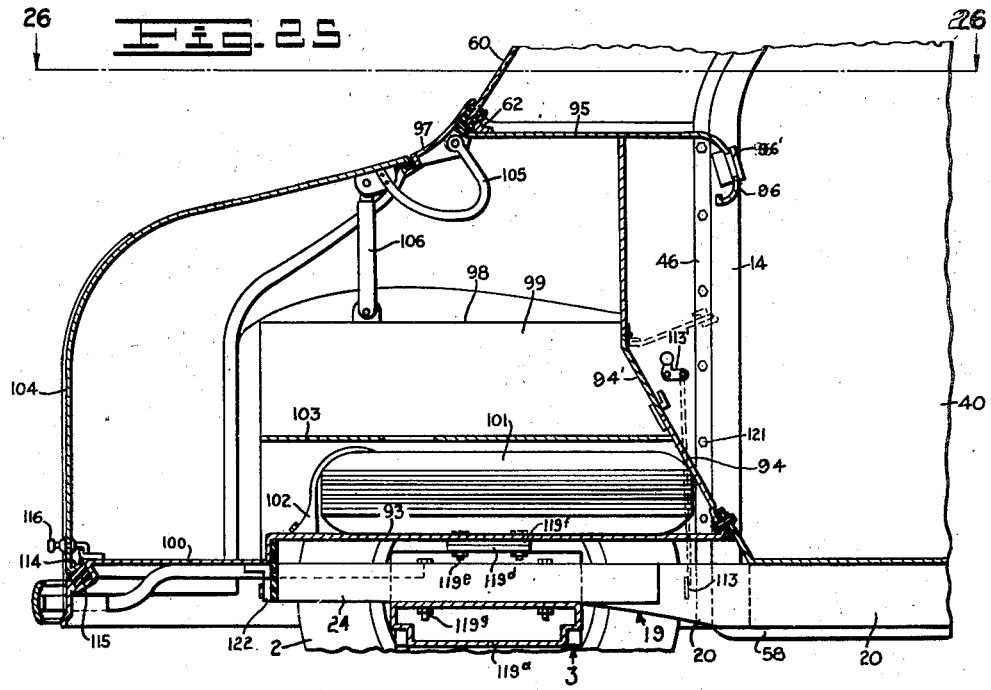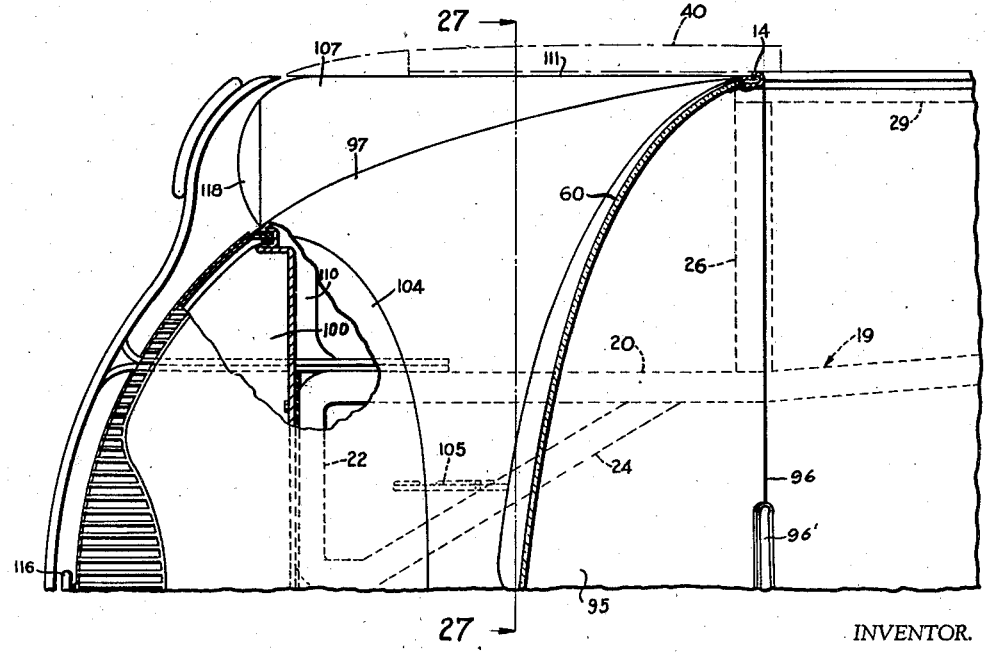

May 30, 1944.　　　　B. J. CRAIG　　　　2,349,940
AUTOMOTIVE VEHICLE CONSTRUCTION
Filed Feb. 12, 1940　　　12 Sheets-Sheet 8
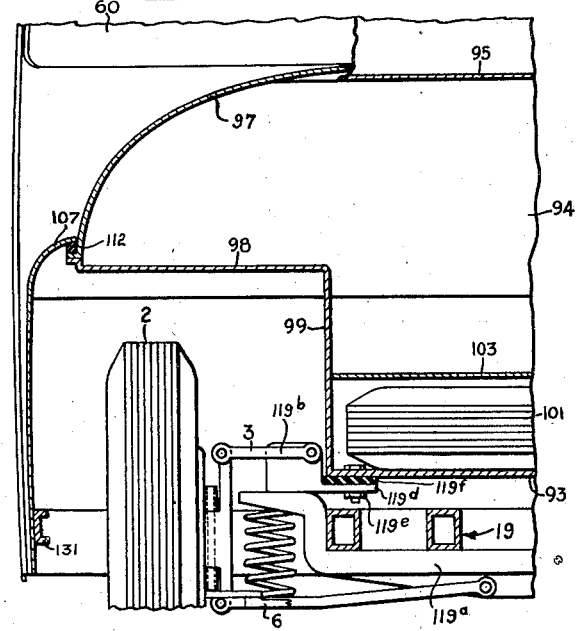
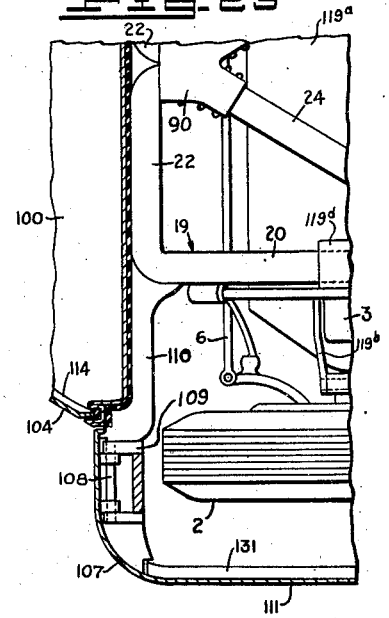
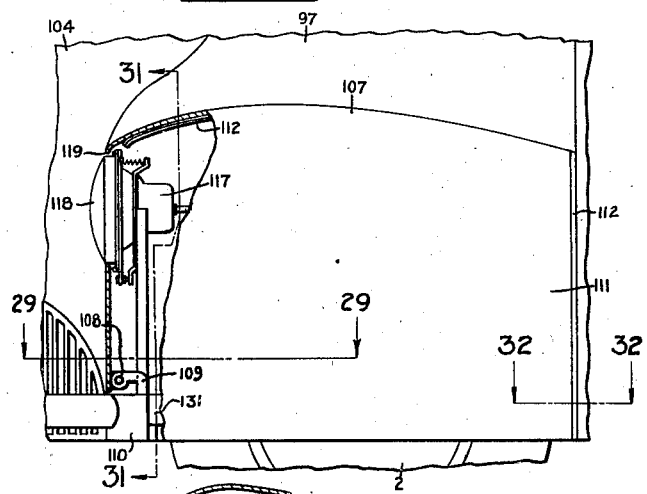
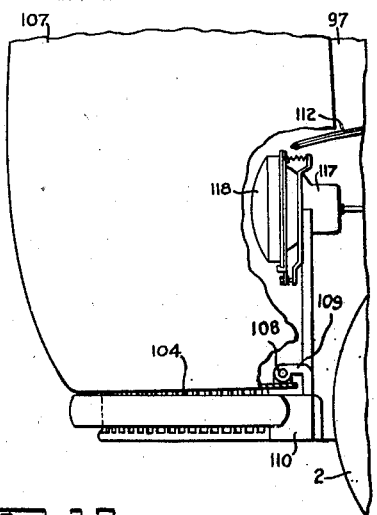
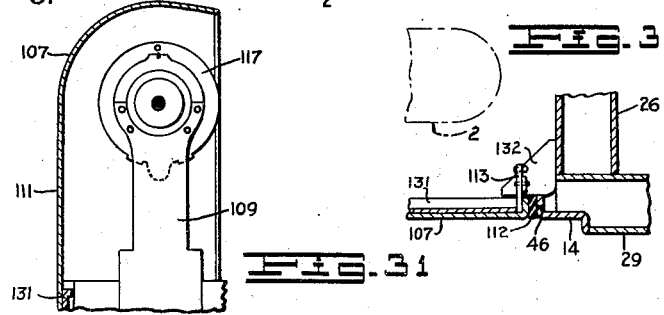
INVENTOR.

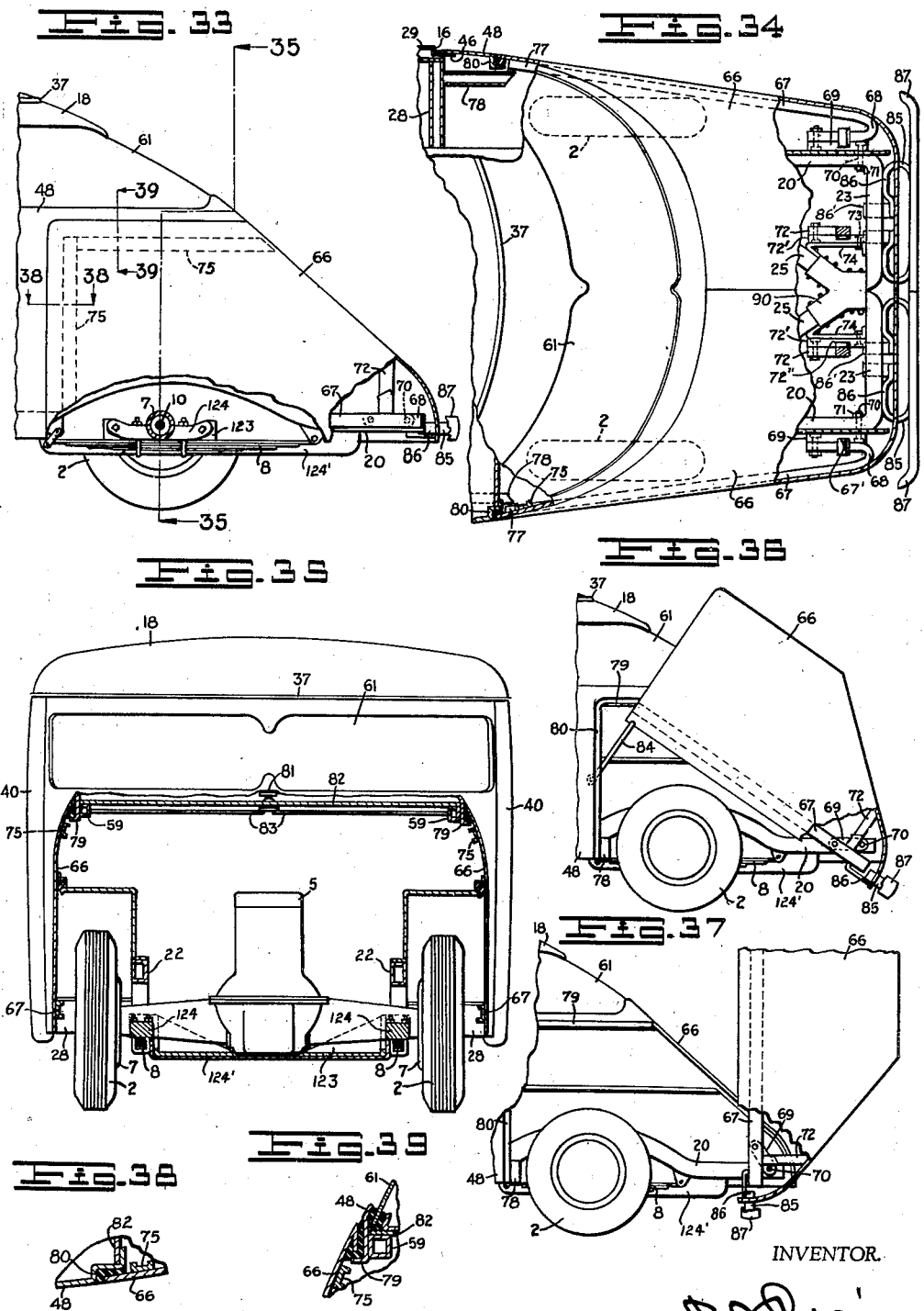

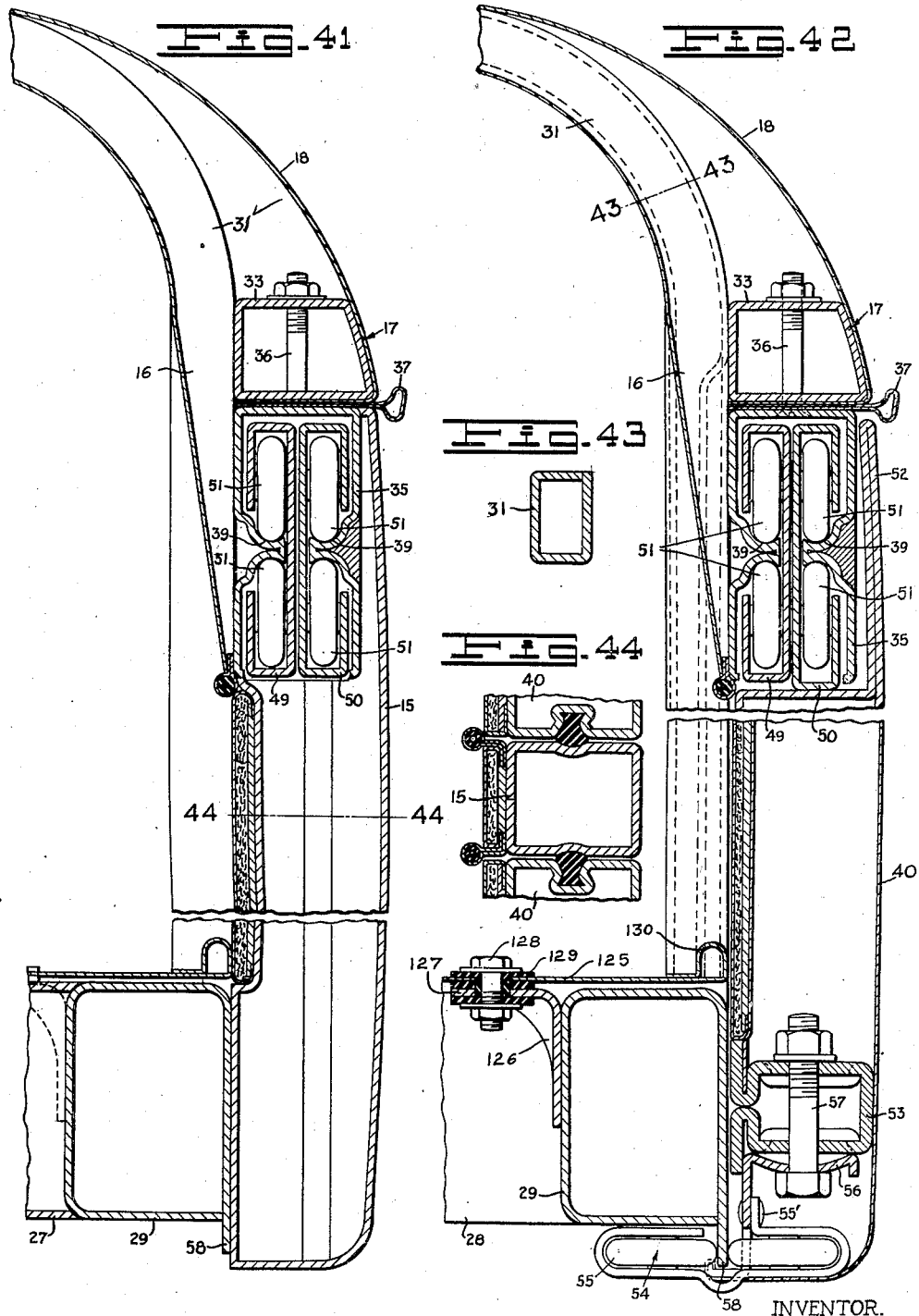

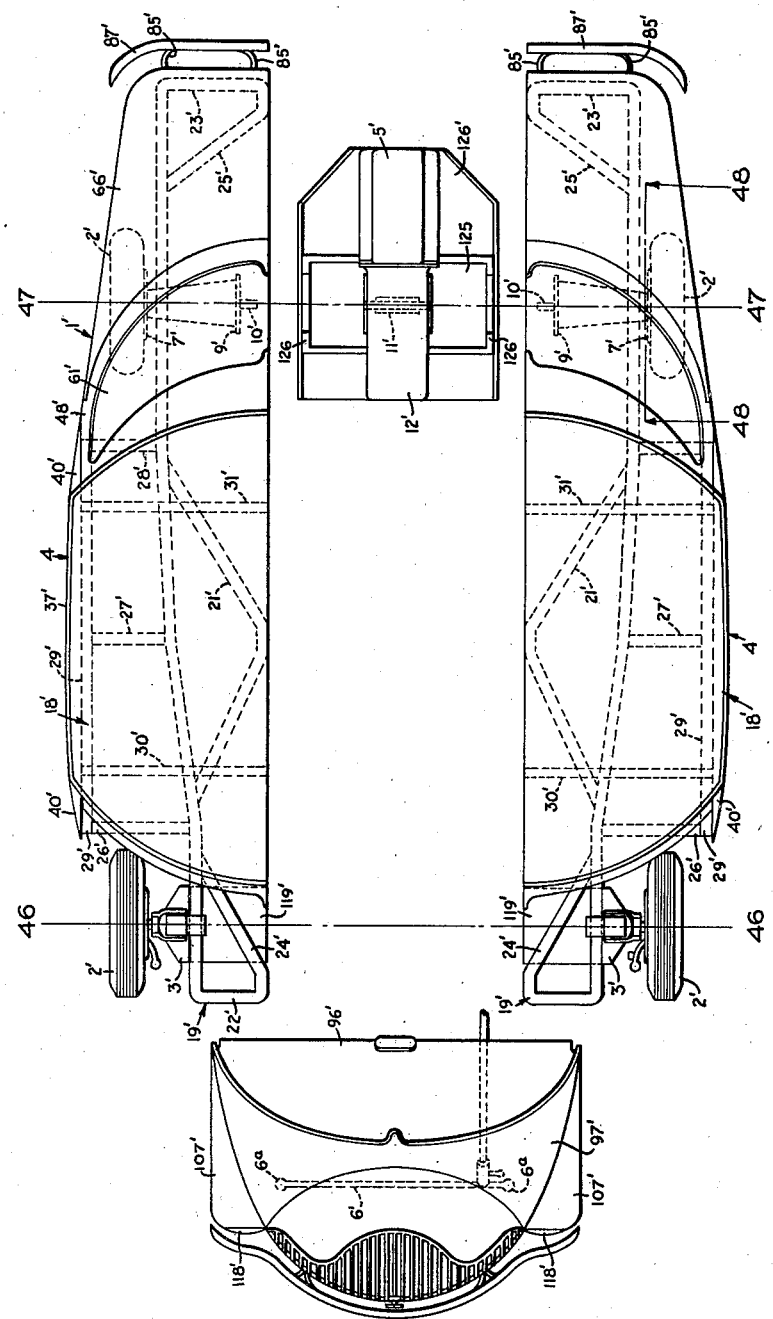

May 30, 1944.  B. J. CRAIG  2,349,940
AUTOMOTIVE VEHICLE CONSTRUCTION
Filed Feb. 12, 1940  12 Sheets-Sheet 12
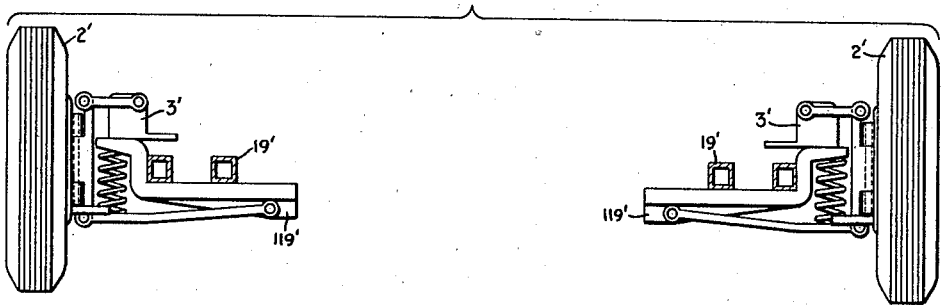
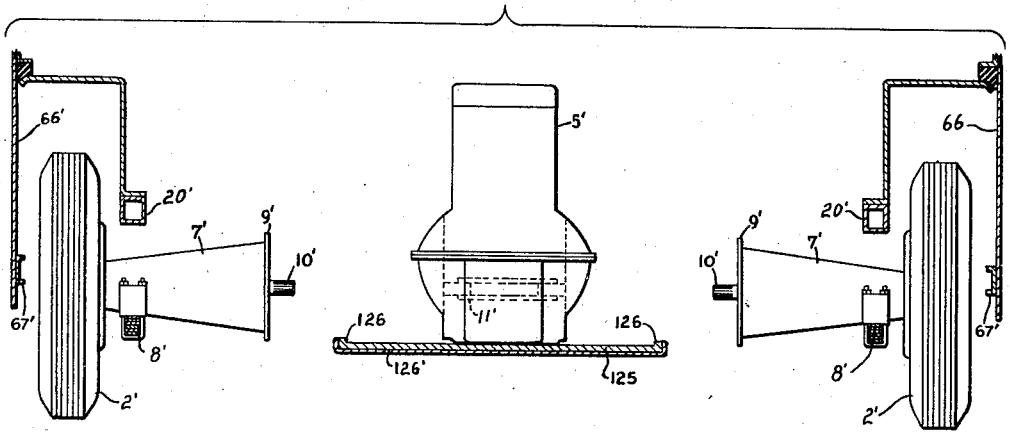
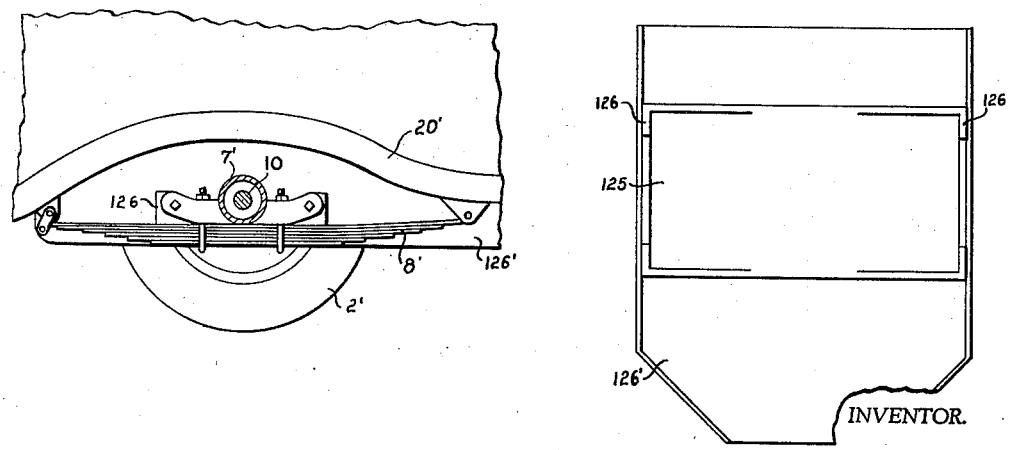
INVENTOR.
B. J. Craig Patented May 30, 1944

2,349,940

UNITED STATES PATENT OFFICE 2,349,940

AUTOMOTIVE VEHICLE CONSTRUCTION

Burnie J. Craig, Los Angeles County, Calif.

Application February 12, 1940, Serial No. 318,397

26 Claims. (Cl. 296—28)

The usual practice in the manufacture of automotive vehicles wherein a unitary body member is mounted on a unitary frame member results in a construction which is objectionable in several respects, and in an endeavor to overcome the problems present other constructions have been proposed, and to some extent used, wherein the body and frame together form a unit. This unit construction, however, presents other problems.

Notwithstanding the objections, each mentioned construction has certain advantages and the general object of the present invention is to provide an improved method and structure wherein certain objections of each mentioned construction are overcome and certain advantages are preserved, while additional advantages without accompanying serious complicating disadvantages are secured, and wherein the changeover in manufacturing equipment and labor training may be readily made and with a resultant body construction so closely resembling the product with which the public is familiar that buyer objection should not become a problem.

A more specific object of the invention is to provide an automotive vehicle body including a pair of unitary, complemental, sub-assembly side members, with each side member including a sub-assembly part-frame and a sub-assembly part-body of such construction that the sub-assembly part-frame and part-body may be united and brought to as nearly a finished condition as desired with the front and/or rear wheels mounted if desired and having all or a part of the wheel accessories such as brakes, springs, steering mechanism, driving means, etc. mounted if desired and with some or so much of the hardware and trim mounted as is desired and with the doors hung if desired and with the members painted if desired, and otherwise finished as desired after which the sub-assembly side members may be securely united and the joints finished to provide a complete body.

In the manufacture of automotive vehicles wherein the body includes an enclosed housing, work on the interior thereof is subject to delay due to the cramped working quarters. With the present invention this problem is overcome since by making the body as unitary sub-assembly side members, which may be more or less complete in themselves, the workmen are permitted to work on both sides of the members when the latter are hung in vertical position and may work all around the members when the latter are flat on a conveyor.

Another object of one embodiment of the invention is to provide an automotive vehicle body construction including complemental right and left part-bodies or sub-assembly members of such character that the rights may be nested and the lefts may be nested thus requiring less shipping and storage space, and less conveyor space.

Another object of the invention is to provide a unitary part-frame and part-body sub-assembly construction wherein the part-frame sustains the part-body prior to final assembly so that the use in unmounted bodies of members which after final assembly have little or no use is avoided.

Another object of the invention is to provide an automotive vehicle including a novel frame construction.

An additional object of the invention is to provide an automotive vehicle construction including a unitary part-body or sub-assembly member and wherein one or more road wheels are mounted operatively on the unit.

An additional object of the invention is to provide an automotive vehicle including a novel body construction.

Another object of the invention is to provide an automotive vehicle construction including a novel unitary sub-assembly member including road wheels and an engine supporting portion.

An additional object of the invention is to provide a novel means for securing access to a compartment in an automotive vehicle.

An additional object of the invention is to provide an automotive vehicle including a body having a unitary or sub-assembly hood mounted to reinforce the body in a novel manner.

An additional object of the invention is to provide an automotive vehicle body including novel means for reinforcing the top.

A further object of the invention is to provide an automotive vehicle including a body having a novel front portion.

Another object of the invention is to provide an automotive vehicle including a body having a novel rear portion.

A further object of the invention is to provide an automotive vehicle body construction including complemental frame and body sub-assembly members wherein certain portions are made of plastic.

Other objects and the advantages of this invention will be apparent from the following description taken in connection with the accompanying drawings, wherein:

Fig. 1 is a top plan view showing the unitary subassembly members in extended position prior to final assembly;

Figs. 2, 3, 4 and 5 are top plan, side elevation, front and rear views, respectively, of the vehicle;

Figure 22:
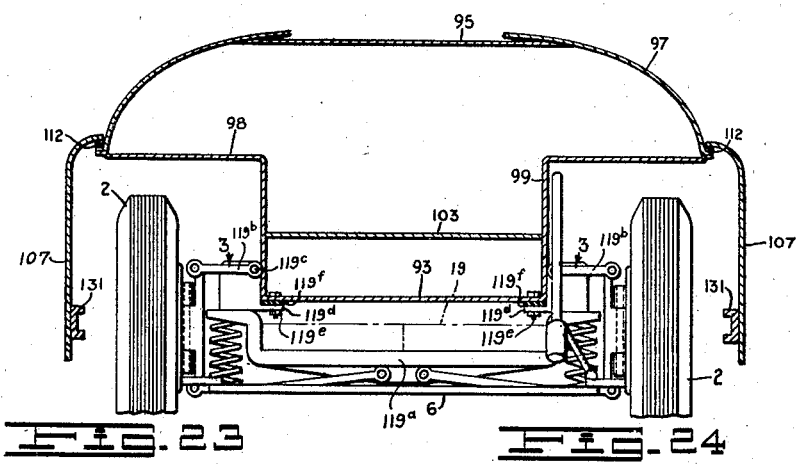
Figures 23, 24:
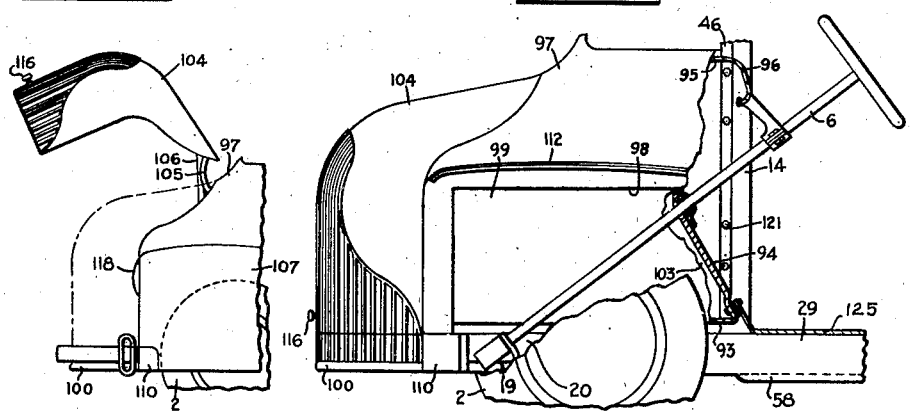
Figures 20, 21:
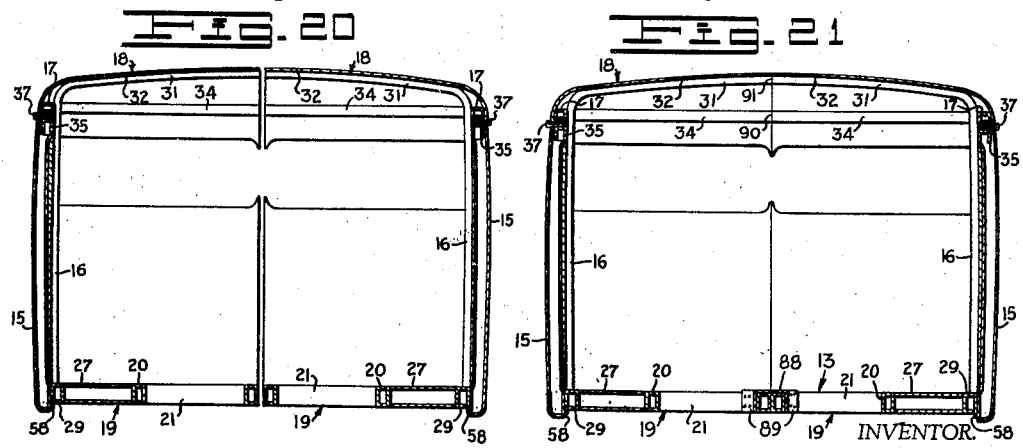

Figs. 6 and 7 are enlarged, fragmentary sectional views taken on lines 6—6 and 7—7, respectively, Fig. ;

Fig. 8 is a top plan view of a pair of complemental lower frame units;

Fig. 9 is a top plan view of a pair of the complemental upper frame units;

Figs. 10, 11 and 12 are enlarged sections taken on lines 10—10, 11—11 and 12—12, respectively, Fig. 9;

Fig. 13 is a fragmentary side elevation of an upper and lower frame unit joined;

Fig. 14 is a top plan view showing two half bodies nested for storage or shipping;

Fig. 15 is a top plan view of the vehicle with the body panels partially broken away to show the frame;

Fig. 16 is a fragmentary section taken on line 16—16, Fig. 15;

Fig. 17 is a side elevation of the vehicle with the body panels partially broken away to show the frame;

Figs. 18 and 19 are enlarged, fragmentary sections taken on lines 18—18 and 19—19, respectively, Fig. 17;

Fig. 20 is a traverse section showing the half-bodies apart;

Fig. 21 is a transverse section showing the half-bodies united;

Fig. 22 is a section taken on line 22—22, Fig. 1;

Fig. 23 is a fragmentary elevation showing the hood opened;

Fig. 24 is a side elevation with parts broken away, showing the hood and its accessories in place on the frame;

Fig. 25 is a fragmentary, central, sectional view through the hood showing the windshield secured in place;

Fig. 26 is a fragmentary section taken on line 26—26, Fig. 25 with parts broken away;

Fig. 27 is a fragmentary section taken on line 27—27, Fig. 26;

Fig. 28 is a side elevation showing the front fender and hood with parts broken away;

Fig. 29 is a fragmentary section taken on line 29—29, Fig. 28;

Fig. 30 is a fragmentary side elevation showing the front fender lifted and with parts broken away;

Fig. 31 is a fragmentary section taken on line 31—31, Fig. 28;

Fig. 32 is a fragmentary section taken on line 32—32, Fig. 28;

Fig. 33 is a side elevation of the rear portion of the vehicle with parts broken away;

Fig. 34 is a top plan view of the rear part of the vehicle with parts broken away;

Fig. 35 is a section taken on line 35—35, Fig. 33;

Fig. 36 is a side elevation of the rear portion of the vehicle showing the rear hood raised to the first position;

Fig. 37 is a view similar to Fig. 36 showing the hood in fully raised position;

Figs. 38 and 39 are enlarged, fragmentary sections taken on lines 38—38 and 39—39, respectively, Fig. 33;

Fig. 40 (see Sheet II) is a fragmentary elevation showing the upper portion of the door;

Figs. 41 and 42 are fragmentary, enlarged sections taken on lines 41—41 and 42—42, respectively, Fig. 3;

Fig. 43 is a section taken on line 43—43, Fig. 42;

Fig. 44 is a section taken on line 44—44, Fig. 41;

Fig. 45 is an extended view similar to Fig. 1 showing a modification;

Figs. 46, 47 and 48 are sections taken on lines 46—46, 47—47 and 48—48, respectively, Fig. 45;

Fig. 49 is a top plan view of the drip pan;

Fig. 50 (Sheet V) is a view similar to Fig. 21 showing a plastic body;

Fig. 51 (see Sheet V) is an enlarged fragmentary view showing the roof joint for the plastic parts;

Fig. 52 (see Sheet V) is a fragmentary plan showing a modified X-frame joint; and Fig. 53 is an enlarged fragmentary section taken on line 53—53, Fig. 52.

Referring to the drawings by reference characters the invention is shown as embodied in an automotive vehicle which is indicated generally at 1. The vehicle includes wheels 2 which in the disclosure are mounted at the front on steerable wheel mountings 3 shown as of the "knee action" type and which support a body 4 in which an engine 5 may be mounted at the rear, although the particular location of the engine is immaterial. The wheel mountings in front are disclosed as steered by mechanism 6 which is suitably connected to the wheels and is actuated by means of the usual steering wheel.

The rear wheels 2 which are shown as the vehicle drive wheels include wheel mountings 7 suitably supported by springs 8 which engage the frame to be presently described. As shown the wheel mountings include housings having flanges 9 for splined axles 10 which in the assembly engage companion members 11 in the transmission 12 while the flanges 9 are secured to the transmission housing as by bolts so that the wheel assemblies may be readily installed or removed.

As shown the body includes a lower frame member 13 which supports front door and windshield pillars 14, body pillars 15, and rear door pillars 16. The pillars support an upper frame member 17 which connects the pillars and defines the tops of the door openings and is engaged by a top 18.

In the disclosure the body includes two integral, complemental, independently made, unitary sub-assembly members which are secured together.

As shown the frame includes two half-frame members 19 (see Fig. 8) each having a side rail 20 with a half-X cross member 21 secured thereto. Each rail 20 further has a front half-cross member 22 and a rear half-cross member 23 secured thereto. The half-cross members 22 and 23 are shown as braced by diagonal members 24 and 25.

Each rail 20 further includes outwardly directed hangers 26, 27 and 28 which support outer rail members 29 which latter in turn support the pillars 14, 15 and 16 previously mentioned. In the disclosure the pillars 14 and 16 are continued inwardly above the door areas as at 30 and 31 to engage half-top members 32.

The upper half-frame members 17 each includes an intermediate portion 33 which connects the pillars and which is supported on the top of the body pillars 15 as by welding and is secured to the outer face of the upper ends of the door pillars 14 and 16 (see Fig. 13). The upper half-frame members 17 as shown each include end portions 34 which engage the inner surface of the front and rear of the half-top members 18.

In the disclosure the half-frame members 17 support track members 35 which serve to support sliding doors which are later referred to but it will be understood that the invention disclosed is not limited to the use of doors of the sliding type since the customary hinged door may be used. The track members 35 as shown are of general inverted U-shape and secured in place as by bolts 36 inserted through suitable apertures in the members 17. A drain and trim strip 37 may be included between the members 17 and 35 and this trim strip may align with trim strips secured to the half-tops 18.

Without inferential limitation to such shapes, certain of the part-frame members are shown as tubular in form being, for instance, substantially rectangular in cross section thereby providing great strength with a minimum of weight.

The members 14 and 16, within the area of the doors, are preferably of the cross section shown in Figs. 18 and 19, respectively, and include shoulders 41 and 42 which engage shoulders 43 and 44 on the doors 40. Direct contact of the shoulders may be prevented by rubber cushion members 45. The doors are contoured adjacent to the shoulders 43 and 44 to form an unbroken contour with that of the adjacent portion of the body. The pillars 14 and 16 include projecting flanges 46 on which panels 47 and 48 constituting a part of the half-bodies are secured.

As shown the doors 40 include projecting cantilever arms 49 and 50 which support rollers 51. On each side of the vehicle the cantilever arms on the front and rear doors are arranged to move in parallel spaced planes so that they do not interfere with each other's movement. The cantilever construction permits the doors to be opened fully as shown in Fig. 2 (in broken lines) while still maintaining the rollers 51 in engagement with their respective tracks.

The doors 40 include upper flanges 52 which extend over the area of the tracks. Each door also includes a lower frame and bumper member 53 which extends across the door and has a width equalling the thickness of the door. The member 53 is disposed in alignment with the adjacent outer rail 29 so that on slight movement of the door inwardly the bumper directly engages the frame rail and thereby serves as a crash bumper to transfer the impact of blows directly onto the frame thus protecting the door.

The frame and bumper members 53 each support roller assemblies 54 including rollers 55. The assemblies 54 are secured at 55' to an inner door frame member 56 clamped to the bumper 53 by bolts 57. The rollers 55 are spaced to receive a flange 58 which is shown as a continuation of one side of the outer rail 29 so that the need for a separate track for the lower rollers is avoided.

Above the door areas the portions 30 and 31 of the members 14 and 16 may be of the shape shown in Fig. 43 with the flange 46 omitted. The perimeter of the closed portions of the members 14 and of the members 16 and their extensions 30 and 31 is preferably uniform throughout their lengths.

Each half-frame as shown includes a rearwardly directed member 59 (see Figs. 15 and 17) which is welded or otherwise secured to the pillar 16 and is covered by an extension on the panel 48. The ends of a windshield 60 and a rear window 61 are secured to the flanges 46 on the pillars 14 and 16 by garnish molding 62 and 62' (Figs. 6 and 7) suitably secured in place. The sides of the windshield and window are secured to the panels 47 and 48 by the garnish molding.

The rear of the body is closed by a pair of hood members 66 (see Figs. 33, 34 and 36). Each hood member includes a bumper member 67 which is suitably secured in place and includes a bent over end portion 68 on which a link 69 is pivoted at one end. The other end of each link 69 is pivotally mounted on a removable pin 70 which is held in place by a nut 71. As will be later described, this construction provides two open positions for the hood members 66.

Each hood member further includes a bracket 72 on which one end of a link 72' is pivoted. The other end of the link 72' is pivoted on a removable pin 73 secured to a bracket 74 which latter is mounted on the members 23 and 25. The pins 70 and 73 are coaxial. The hood members each include vertical and lateral brace members 76.

The rear bent over portion of the bumper 67 engages the link 69 which in turn engages the rail 20 when the half-hood is closed while the forward end 77 of each bumper engages the outer end of a bracket 78 on the associated hanger 28. Thus the bumper under crash impact tends to transfer the blow directly to the frame.

Each hood member 66 when closed engages a flange 79 on the panel 48 and abuts against a shoulder 80 on the rear edge of the same panel 48, see Figs. 38 and 39. A latch 81 on a fire wall 82 supported on the members 59 is operable from within the vehicle and includes arms 83 which secure the hood members 66 in closed position. The edges of the fire wall 82 engage the panel 48 as shown in Fig. 39 and extend horizontally and then downwardly as shown in Fig. 3 separating the engine compartment from the passenger compartment.

In the complete vehicle each half-hood covers the adjacent wheel 2. To allow access to and replacement of a tire the half-hood is raised to the position shown in Fig. 36 and may be held in this position by a bracket 84. When fully opened to allow access to the engine the hood assumes the position shown in Fig. 37 which position it holds due to the location of the axis of its pivoted support.

It will be seen that when lifted the hood first pivots about the forward pivots of the links 69 and 72'. When lifted further a tongue 67' secured to the bumper 67 engages the link 69 and a tongue 72'' engages the link 72' and thereafter the hood pivots about the rear pivots of the links 69 and 72'. By removing the pins 70 and 73 the hood members may be completely removed to facilitate removal of, or repairs to, the engine or for other purposes.

Each hood member 66 includes a rear bumper support 85 which extends through the hood and has inner resilient portions 86 disposed when the hood is in down position as shown in Fig. 34, adjacent the half cross member 23 of the frame. The resilient portions 86 include end portions 86' which are bent so that they are beneath the member 23 when the hood member is closed. A rear bumper 87 is suitably secured to each support 85.

A blow on one of the bumpers 87 causes the latter to move inwardly so that the portions 86 thereon engage the half cross members 23 and transfer the blow to the frame members. The impact of a rearward glancing blow on the end of a bumper is transferred to the member 23 through the bent portions 86'.

The two unitary members described may be brought to as near a completely finished condition as desired, for instance, with hardware and trim mounted and the finished doors hung. The parts may be painted if desired. In manufacture the part bodies may be hung vertically from a conveyor or may be laid flat or otherwise supported to permit work on both sides or around the entire sub-assembly. In shipment, or for storage, the sub-assemblies, finished so much as desired, may be suitably nested as shown in Fig. 14.

In the disclosure the edges of the part-bodies and part-frames are coplanar so that when the complementary parts of the vehicle are ready for assembly they are brought to the position shown in Fig. 21 and the parts are connected. As shown connection is effected by a coupling member 88 (see Figs. 15 and 16) which engages the half-cross members 21 and is held in place by suitable fastening means such as by rivets 89, by welding, etc. The half-cross members 22 and 23 are similarly united by coupling members 90.

The portions 30 and 31 are then united as by welding at 91 (Fig. 15) and the portions 34 are similarly united at 92. The rearwardly extending members 59 beneath the rear window 61 are likewise united as are the half tops 32. Thus complete passenger and engine compartments are provided.

The front hood which is disclosed as a unitary, sub-assembly member may next to be secured in place. The front hood (see Figs. 1 and 22 to 29, inclusive) includes a bottom portion 93 which is mounted on the forward extension of the lower frame and also includes an upwardly extending partition 94 which is surmounted by a top portion 95 having a dash member 96 thereon which may include the usual instruments 96'. The partition 94 includes a door 94' to provide access to the storage space which is provided by the hood.

The hood includes a cowling 97 which in the disclosure extends downwardly and outwardly with the lower portion thereof secured to a top 98 of a wheel housing which includes a vertically disposed panel 99 connected to the bottom portion 93. The bottom portion 93 includes a step portion 100 which extends across the hood. The bottom 93 forms a support for a spare tire 101 which may be secured in place by suitable brackets 102. A partition 103 in the hood forms the bottom of a storage compartment.

The hood is closed by a closure member 104 which is mounted on a concealed hinge 105. A pivoted arm 106 mounted on the top 98 of the wheel housing engages the hood when the latter is raised to thereby hold it in this position. (See Fig. 23.)

Each wheel housing is closed by a fender 107 which is pivoted on a shaft 108 mounted on brackets 109 secured to a support 110 mounted on the front end of the frame. The fenders shown include plane outer faces 111 over which the front doors move (see broken line position Fig. 2). The fenders 107 engage cushion strips 112 on the cowling 97, catch member 113 including a hand operated release member 113' accessible from within the passenger compartment serves to hold the fenders in closed position so that unauthorized removal of the tires or headlights (to be later described) is prevented.

The hood closure 104 includes a lower flange 114 which when the hood is closed (see Fig. 25) engages a cushion member 115 on the step portion 100 of the hood bottom. The hood is shown as held in closed position by hand released fastening means 116. The support 109 supports a standard headlight 117 which includes a lens 118. The fender includes an aperture 119 (see Fig. 28) which receives the lens 118. It will be seen that when the fender 107 is raised (see Fig. 30), access may be had to the adjacent front wheel and the adjacent headlight.

As shown (see particularly Figs. 22, 25 and 27) the wheel mountings 3 are arranged on a cross member 119a and include a link 119b which is secured to a shock absorber as at 119c. The shock absorber includes a flange 119d which engages the hood along the edges of the bottom thereof and which in turn is secured to the hood as by bolts 119e. A suitable rubber mounting 119f may be included in the joint. The cross member 119a connects the wheel mountings and intermediate its length engages the forwardly extending portions of the half-frame members 19 and is secured thereto as by bolts 119g.

The hood, cushioned by rubber mounting members 120, is secured to the front door pillar of the frame by bolts 121 and is also secured to the forwardly projecting end of the frame by means shown as brackets 122. Thus it will be apparent that the hood, including the front wheel housing members, serves to secure the front portions of the body together while the hood is braced by the wheel mountings to provide great rigidity. The dash 96 may be bolted at both ends to the adjacent front pillars 14.

The rear unitary motor sub-assembly includes the wheel mounting 7 and the axle housings having flanges 9 on the inner ends thereof which are shown as secured by suitable bolts to each side of the transmission housing 5. A brace member 123 shown as secured to supports 124 which engage the springs, serves to aid in supporting the engine and its transmission housing and also supports a drip pan 124' which protects the bottom of the motor and transmission and serves to catch oil drippings.

In assembly the two side sub-assembly members are preferably first mounted after which the front hood may be mounted and then the rear wheel assembly springs 8 are mounted on the frame.

As shown in Fig. 42 a resiliently mounted floor 125 may be disposed between the outer rail members 29. The floor 125 is shown as secured to the members 29 through brackets 126 secured to the rails 29 as well as to other suitably spaced parts of the frame. Each bracket includes a flange 127. Bolts 128 engage the floor 125 and the flange 127 through cushion members 129. The edge of the floor may be finished with a suitable bead as at 130.

The front fenders 107 include crash bumpers 131 which are secured to the inside thereof. The bumpers 131 terminate forwardly adjacent the supports 110 and rearwardly they terminate adjacent the pillars 14. Impact on a bumper 131 is transmitted to the frame through the support 110 and through a corner member 132 secured to the hanger 26.

In Figs. 45 to 49, inclusive, parts similar to those previously described are designated by similarly primed reference characters. In the disclosure the cross member 119' is divided and each part mounted on the forwardly extending part of the half frame members 19' with the wheel mountings 3' and wheels 2' thereon. Each mounting 7' at the rear together with the associated flanged axle housing 9' is mounted on the rear portion of a half-frame member. Thus two unitary, complemental, half-frame and half-body or sub-assembly members with their road wheels thereon and with appropriate steerable portions and transmission portions for the road wheels are provided.

The hood member in the disclosure includes steering mechanism 8' with coupling members 6a thereon. The engine 5' includes a transmission with members 11' adapted to receive splined axle 10' which drive the wheel mountings. The flanges 9' on the shaft housings are secured to the engine 5' and a brace member 125 having end portions 126 connected to the springs serves to hold the parts assembled. A splash pan 126' is mounted on the brace member.

The construction shown in Fig. 45 thus includes four unitary members namely, two half frame and body sub-assembly members; a front hood; and a rear engine and its mounting. The shape of the unitary members is such that they may be shipped with a minimum of space.

In assembly the body parts may be arranged at each side of the engine and may be moved towards the engine unit so that the axles 10' engage their companion spline members 11' after which the flanges 9' may be suitably secured to the transmission housing.

In manufacture the two half frame and body members with their road wheels thereon may be united in the manner previously described to thus provide a body with the engine mounted and with road wheels in place.

The hood member may then be moved to position in engagement with the front end of the frame and may be secured to the frame and body members as previously described. The steering mechanism 66a being then coupled to the companion members on the steerable wheel mountings and the controls and circuits connected the vehicle is ready for use.

For engine repairs suitable removable securing bolts would permit the engine and/or transmission to be removed from the body without requiring separation of the half-frame members.

The unitary construction herein described enables manufacture of the sub-assemblies with a minimum of conveyor space and with the workers working all around the sub-assemblies. The construction further permits the sub-assemblies to be shipped to a delivery point with a minimum of conveyance space. When the half-frame and body sub-assemblies are shipped prior to their connection they may be nested to conserve space and for their mutual protection.

The half-body sub-assemblies may be connected and shipped in that manner. The front hood assemblies may also be shipped as independent units and this plan provides for a considerable saving of shipping space. Thus economy in shipping is secured regardless of the time the sub-assemblies are united.

In the event of severe damages to a hood such repair can be handled economically by substituting a new hood. Damages to one side of the body may be repaired by substituting a new half-body and frame sub-assembly. Thus major repairs can be effected in a structure which does not in any way make minor repairs more difficult.

A modification shown in Fig. 50 includes a vehicle body having a plastic top 150. Members similar to those previously described are designated in Fig. 50 by similarly primed reference characters. The joint between the halves may be as shown in Fig. 51. A channel strip 151 engages beads 152 on the top 150 and may be thermally secured in place. It will be understood that this is merely one of a number of methods of joining the top-halves. Other portions of the body may also be made of plastics as for instance the doors and body panels.

In Figs. 52 and 53 a modified X-frame joint is shown. This joint may accommodate the propeller shaft of a vehicle having a forwardly mounted engine. Members similar to those previously described are designated by similar double-primed reference characters. A coupling member 160 similar to the coupling member 88 is secured to the members 21'' as shown. It will be seen that the member 160 is of such construction that a propeller shaft (not shown) may pass between the members 21'' and beneath the coupling member 110.

Having thus described the invention, I claim:

1. An automotive vehicle having a closed body comprising a plurality of compartments, the body including two unitary, complementary, side members, each side member constituting one half of the compartments and each including a continuous running gear supporting side rail and a body portion supported thereby, the side rails projecting beyond the body portion at one end thereof, the side members each constituting integral portions connected together and an additional unitary compartment forming member disposed above the projecting portions of the side rails and concentric thereto.

2. In an automotive vehicle construction, a roof supporting pillar, the pillar being of one piece, tubular and of closed section and having a longitudinally extending, door engaging shoulder thereon disposed intermediate one side thereof, said shoulder extending to the outer face of said one side.

3. In an automotive vehicle construction, a roof supporting pillar, the pillar being of one piece, tubular and of closed section and having a shoulder thereon disposed intermediate one side thereof, a flange projecting outwardly from the shouldered side, a window member engaging the flange, and a molding member mounted on the pillar and engaging the window member.

4. An automotive body including a pair of unitary passenger compartment forming side members and a pair of unitary compartmental end members each having road wheel mountings thereon, said side members being connected, each side member including a frame portion and a body forming portion, the frame portions projecting beyond the body portions and said compartmental end members being connected to the projecting frame portions.

5. In an automotive vehicle construction, a body including a frame having a pillar thereon at each side thereof, a member connecting the pillars, a panel on each pillar, a panel on the member, means engaging the upper portion of the member panel to support a window, the body including a compartment, closures for the compartment pivotally mounted on the frame, the closures when in one position engaging the panels.

6. In an automotive vehicle construction, a body having a pillar thereon at each side thereof, a member connecting the pillars, a panel on each pillar, a panel on the member, means engaging the upper portion of the member panel to support a window, a flange on the lower portion of the member panel, a flange on each pillar panel, the body including a compartment, pivoted closures for the compartment, the closures when in one position engaging the flanges.

7. In a vehicle construction, a pair of complemental, sub-assembly, body forming, side portions connected together, each portion including a side rail, the side rails including spaced portions near one end of the sub-assembly, and a unitary, sub-assembly, engine supporting, member secured to the spaced side rail portions.

8. In a vehicle construction, a body including a pair of complemental side portions, each side portion including a continuous side rail, the side portions being connected together and a unitary, sub-assembly, engine supporting unit secured to the side rail portions and road wheel mountings on the engine supporting unit.

9. In a vehicle, a pair of unitary, separately formed sub-assembly members, each sub-assembly member including a part-frame having upper and lower separately formed frame members with parallel central portions and connecting pillars forming door openings, means securing the ends of the upper frame members together, and means securing the ends of the lower frame members together at a point remote from the location where the upper frame members are secured together.

10. A combined half-chassis underframe and passenger forming compartment sub-assembly member comprising a half-passenger compartment forming member forming a half body and a half frame disposed below the half body, vertical pillars supported on the half frame and engaging the half body, said pillars being spaced to define a door opening, said half frame including a side rail member and at least one transverse member connected to said side rail, all of said parts being rigidly connected.

11. A side unit for use in making a closed vehicle body, including a unitary, fractional, passenger compartment forming body member, the member including a side fixedly joined to at least another portion of a passenger compartment, the member also including pillars defining a door opening, a door hung on the member and closing the opening, and a longitudinal extending underframe along the lower edge of the fractional member, the underframe including a side rail and an inwardly directed floor supporting member, the body member, pillars, side rail and floor supporting members being fixedly connected together.

12. A vehicle body sub-assembly member comprising a body forming shell and including an inwardly directed underframe portion along the lower side, the shell being fixedly connected to the underframe, the shell being concave and having an uninterrupted inner portion, and the underframe including an uninterrupted concave portion, the concave uninterrupted portions permitting a plurality of the members to be nested.

13. For use in making a vehicle body of the enclosed type, a sub-assembly member including a longitudinally extending, running gear supporting side frame member, said side frame member being continuous throughout its length, a passenger compartment forming member rigidly secured on the side frame and extending at one end to form a portion of a housing, the side frame member projecting beyond the other end of the passenger compartment forming member, the sub-assembly member having substantially the shape of one half of a vehicle body.

14. For use in making a vehicle body of the enclosed type, a sub-assembly member including a shell having a side, a side panel, a part-top and a part-end, said side panel, part top, and part end being rigidly connected, a rail member including a projecting portion connected to said shell, and a road wheel mounted directly on the projecting portion of the sub-assembly side rail member.

15. For use in making an automotive vehicle body of the enclosed type, a sub-assembly member including a longitudinally extending separately formed, running gear supporting side frame having a front and a rear wheel mounting thereon, a separately formed compartment forming member on the side frame and extending at one end beyond the adjacent wheel mounting, the compartment member forming a portion of an engine housing, the sub-assembly member having substantially the shape of one half of an automotive vehicle body.

16. For use in making a vehicle body, a sub-assembly member comprising a running gear supporting half-frame member including a longitudinally extending side member having a front part-cross member, a rear part-cross member and an intermediate part-cross member thereon, a rail supported on the side member, spaced pillars on the rail, and a half-top supported by the pillars.

17. An automotive vehicle having a closed body including a passenger compartment, the body including two complementary side members, each side member including a half-frame member and a half-body member, each half-frame member including an intermediate portion which engages a corresponding intermediate portion on the other half-frame, each half-frame member including a continuous longitudinal running gear supporting rail with a pillar rigidly mounted thereon, each half-body member constituting a unitary rigid portion and including a portion of the top and a portion of the side of the body, each portion of the top being rigidly secured to the associated portion of the side, and each portion of the side being rigidly mounted on its associated half-frame, the end portions and the intermediate portions of the complementary side members being rigidly connected.

18. An automotive vehicle including a frame having a body thereon, said frame at one end including an unjointed continuous portion projecting beyond the body, a road wheel mounting fixedly secured to the projecting frame portion, and a unitary, separately formed, compartment member mounted on the projecting frame portion and secured to the projecting frame portion and to the body.

19. An automotive vehicle having a closed body including a passenger compartment and a second compartment, the body including two longitudinal, complementary, unitary, side members which when joined constitute the passenger compartment, the side members each including a side rail having a pillar thereon, each side member including a portion of the top and a portion of the external sides of the body, the side rails being continuous throughout their length, the side members being rigidly connected together, the side rails projecting unjointedly beyond one end of the passenger compartment, the second compartment comprising a separately formed member having road wheel mountings thereon, said second compartment being secured to the projecting portion of the side rails.

20. An automotive vehicle having a closed body including a compartment, the body including two longitudinal, complementary, separately formed side members, each side member including a separately formed continuous, lower, side, frame member with connecting pillars and a pair of part body members, each part body member constituting an integral portion formed independently of its associated frame member, each part body member including a top portion and a side portion, each of the part body members being rigidly secured to its associated frame member, the side frame members being secured together and the part body members being secured together.

21. In an automotive vehicle construction, a body including front and rear door pillars on each side, means extending transversely across the vehicle and connecting the front door pillars, other transverse means connecting the rear door pillars, means extending along each side of the vehicle and connecting the tops of the pillars along each side, the side connecting means being continuous and extending rearwardly and forwardly of the pillars, the extended portions being bent inwardly towards the center of the body and being connected.

22. An automotive vehicle having a closed body including a passenger compartment and a second compartment, the body including two complementary, unitary, side members which when joined constitute one half of the passenger compartment, the side members each including a side rail and each having a pillar thereon, each side member including a portion of the top and a portion of the external sides of the body, the side rails being continuous throughout their length, the side members being rigidly connected together, the side rails projecting beyond the passenger compartment, a road wheel mounting on the projecting portion of each side rail, the second compartment comprising a separately formed member secured to the projecting portion of the side rails.

23. An automobile body including a passenger compartment and a pair of unitary end members each having road wheel mountings thereon, the passenger compartment including a frame portion and a body-forming portion, the frame portion being disposed upon the lower part of the body-forming portion, the frame portion at one end projecting beyond the adjacent body portions, one of said end members being connected to the projecting frame portions and to the body and the other end member being arranged beneath the body and connected to the frame portion at the other end of the body.

24. An automobile body including a passenger compartment and a pair of end members each having road wheel mountings thereon, the passenger compartment including a longitudinally extending frame portion and a body portion mounted upon the longitudinally extending frame portion, one of said end members including a housing portion engaging a part of the body portion above the frame portion and having portions engaging and secured to the longitudinally extending frame portion at one end of the body, the other end member being arranged beneath the body and connected to the frame portion at the other end of the body.

25. An automobile body including a pair of unitary passenger compartment forming side members and a pair of unitary end members each having road wheel mountings thereon, said side members being connected, each side member including a frame portion and a body-forming portion, the frame portions being disposed upon the lower part of the body-forming portion, the frame portions at one end of the body projecting beyond the adjacent body portions, one of said end members being connected to the projecting frame portions and the other end member being connected to the frame portions at the other end of the body.

26. An automotive vehicle comprising a frame member, springs on said frame member, wheel mountings supported by said springs, each wheel mounting including an axle portion, said axle portions extending towards each other, a support member mounted on said springs, and an engine mounted on said support member, said engine including a transmission device having members thereon drivingly engaging said axle portions.

BURNIE J. CRAIG.